(12) United States Patent
Gilbert (10) Patent No.: US 6,591,550 B2
(45) Date of Patent: Jul. 15, 2003

(54) FLORAL CONTAINER

(75) Inventor: Scott R. Gilbert, Hinckley, OH (US)

(73) Assignee: Professional Package Company, Strongsville, OH (US)

( * ) Notice: Subject to any disclaimer, the term of this patent is extended or adjusted under 35 U.S.C. 154(b) by 0 days.

(21) Appl. No.: 09/924,696

(22) Filed: Aug. 8, 2001

(65) Prior Publication Data

US 2002/0017059 A1 Feb. 14, 2002

Related U.S. Application Data (60) Provisional application No. 60/223,938, filed on Aug. 9, 2000.

(51) Int. Cl.$^7$ .......................... B65D 85/52; B65D 85/50
(52) U.S. Cl. ............................................ 47/84; 206/423
(58) Field of Search ................................ 206/423; 47/84, 47/79, 60, 61; 220/574.2, 573.4

(56) References Cited

U.S. PATENT DOCUMENTS

| | | | |
|---|---|---|---|
| 18,099 A | | 6/1857 | Ferguson |
| 1,003,112 A | * | 9/1911 | Johnson .................. 126/377.1 |
| 1,698,914 A | * | 1/1929 | Kircher .................... 126/377.1 |
| 2,106,487 A | * | 1/1938 | Lumry ....................... 206/423 |
| 2,484,631 A | * | 10/1949 | MacDonado ............... 220/301 |
| 2,801,742 A | | 8/1957 | Farrell |
| 3,021,046 A | | 2/1962 | Pullen |
| 3,087,666 A | | 4/1963 | Kitchell |
| 3,142,133 A | * | 7/1964 | Brooks ...................... 206/423 |
| 3,284,949 A | | 11/1966 | Park |
| 3,660,934 A | * | 5/1972 | Pollack et al. ............. 206/423 |
| 3,754,642 A | * | 8/1973 | Stidolph .................... 206/423 |
| 3,825,113 A | | 7/1974 | Kramer et al. |
| 3,863,831 A | | 2/1975 | Wozniacki et al. |
| 3,883,990 A | * | 5/1975 | Stidolph .................... 206/423 |
| 3,924,354 A | * | 12/1975 | Gregoire ................... 206/423 |
| 4,103,819 A | | 8/1978 | Muise |
| 4,113,093 A | | 9/1978 | Hendrickx |
| 4,164,174 A | * | 8/1979 | Wallsten ................... 220/23.87 |
| 4,165,806 A | | 8/1979 | Cayton |
| 4,600,142 A | | 7/1986 | Quaintance |
| 4,618,069 A | | 10/1986 | Quong |
| 4,941,572 A | | 7/1990 | Harris |
| 4,953,782 A | | 9/1990 | Noland |
| 5,121,877 A | | 6/1992 | Bodary et al. |
| 5,141,149 A | * | 8/1992 | Fulton ........................ 206/423 |
| 5,370,303 A | | 12/1994 | Fry |
| 5,458,283 A | | 10/1995 | Southwell et al. |
| 5,851,484 A | * | 12/1998 | Forno et al. ................ 206/363 |
| 2002/0017059 A1 | * | 2/2002 | Gilbert ........................ 47/84 |
| 2002/0038802 A1 | * | 4/2002 | Tersch ..................... 220/573.4 |

FOREIGN PATENT DOCUMENTS

| | | | |
|---|---|---|---|
| FR | 2671781 | * | 7/1992 |
| FR | 2802188 | * | 6/2001 |
| WO | WO 98/43896 | * | 10/1998 |

OTHER PUBLICATIONS

Pagter Innovations, *Procona® Innovation that makes your profit grow!*, published prior to May 24, 1999.

* cited by examiner

Primary Examiner—Peter M. Poon
Assistant Examiner—Jeffrey L. Gellner
(74) *Attorney, Agent, or Firm*—Renner, Otto, Boisselle & Sklar, LLP (57) ABSTRACT

A floral container including a receptacle that holds a liquid and an insert which supports the floral grouping. The insert is positioned within the receptacle above the bottom wall of the receptacle to define a liquid-holding region. The side walls of the receptacle and the side walls of the insert may define a spill-catching region which communicates with the liquid-holding region of the container to catch displaced liquid if the floral container is tilted. The insert may include a divider positioned to form compartments through which the stems may extend to the liquid-containing region of the receptacle. The floral container may be loaded into an outer container to form a floral shipper and a plurality of these floral shippers may be assembled on a pallet.

32 Claims, 7 Drawing Sheets

FLORAL CONTAINER

RELATED APPLICATIONS

This application claims the benefit of U.S. patent application Ser. No. 60/223,938 filed Aug. 9, 2000.

FIELD OF THE INVENTION

This invention relates generally as indicated to a floral container and, more particularly, to a floral container comprising a liquid-holding receptacle and an insert which supports the floral grouping in an upright position within the receptacle.

BACKGROUND OF THE INVENTION

Cut flowers are commonly "wet packed" to keep them fresh during shipping and/or presentation by immersing their stems in water, or a water/preservative mixture. A "wet" floral container is typically provided to carry the fresh cut flowers and the associated "wet" liquid. Such a floral container should be of a sufficient stiffness to support the flowers and should be of a sufficient waterproofness to hold the liquid. If easy handling and carrying is necessary, the floral container also should be lightweight.

To ship fresh flowers, the floral container may be boxed inside an outer container to form a floral shipper. The outer container is typically a rectangular box having a height sufficient to extend above the tops of the flowers supported within the floral container. The box may be made of corrugated cardboard as this material provides the necessary stiffness, is lightweight for easy handling during assembly, and provides a resilient, shock absorbing structure for the floral container within (and, consequently, the floral grouping) during shipping. Any liquid that spills or leaks from an inner floral container due to, for example, tilting of the floral shipper, will probably contact and possibly damage the outer cardboard material.

Once the floral shipper arrives at a retail setting, the inner floral container is removed from the outer cardboard box. If the floral container is of a suitable display size and is aesthetically pleasing, the wet-packed flowers may be presented in it. Otherwise, it may be necessary to transfer the flowers to a display container for presentation purposes. In either case, if the display container does not prevent or at least minimize spills, this may be reflected in constant clean up at the retail level thereby resulting in increased costs and associated inconvenience.

SUMMARY OF THE INVENTION

The present invention provides a floral container for wet-packed fresh flowers that provides a stiff yet lightweight structure for holding water and one or more floral groupings. The floral container includes built-in liquid retention features to help prevent spill-related damage. The floral container also is of a convenient size and exhibits an aesthetically pleasing look for presenting flowers so that it may be used at the retail level.

More particularly, the floral container comprises a receptacle which holds a liquid and an insert which supports the floral grouping(s). The insert is positioned within the receptacle above its bottom wall thereby defining a liquid-holding region of the container. The insert defines a passageway to the liquid-holding region whereby the stems of the floral grouping may extend through the passageway and into the liquid holding region. The receptacle's side walls and the insert's side walls define a spill-catching region which communicates with the liquid-holding region.

The receptacle may have a substantially rectangular box-like shape with side walls that taper inwardly toward its bottom wall. The insert may have a substantially rectangular box-like shape having a lesser height than the receptacle so that the insert's bottom edges will be positioned above the liquid-holding region. The side walls of the insert may taper inwardly in the same direction as the receptacle's side walls, but spaced from them to form the spill-catching region between the respective side walls.

The receptacle and the insert may include locking components (such as a matching groove and bead or interlocking barbs) which mate together in the assembled floral container. The locking components may be formed, for example, on a lip extending outwardly from the insert's side walls and on an upper surface of the receptacle. Additionally or alternatively, the insert may include one or more dividers that form one or more compartments through which the floral stems may extend into the liquid-holding region.

To use the floral container, liquid is poured into the receptacle to a level which will be below that of the bottom edges of the side walls of the insert in the assembled container. If the receptacle and the insert are separate parts that may be selectively assembled and disassembled, the insert is placed into the receptacle and the locking components are mated together. Floral groupings are placed in the insert and, if the insert includes a grid, the floral groupings may be evenly distributed among the compartments.

The floral container may then be loaded into an outer container to form a floral shipper. Additionally, a plurality of these floral shippers may be assembled in columns and rows on a pallet to form a floral shipper assembly. Each of the shippers may have length and width dimensions so that the overall length dimension and the overall width dimension of the floral shipper assembly corresponds to the width and length of the pallet.

The present invention provides these and other features hereinafter fully described and particularly pointed out in the claims. The following description and drawings set forth in detail a certain illustrative embodiment of the invention. This embodiment is indicative, however, of but one of the various ways in which the principles of the invention may be employed.

DETAILED DESCRIPTION

Figure 1:
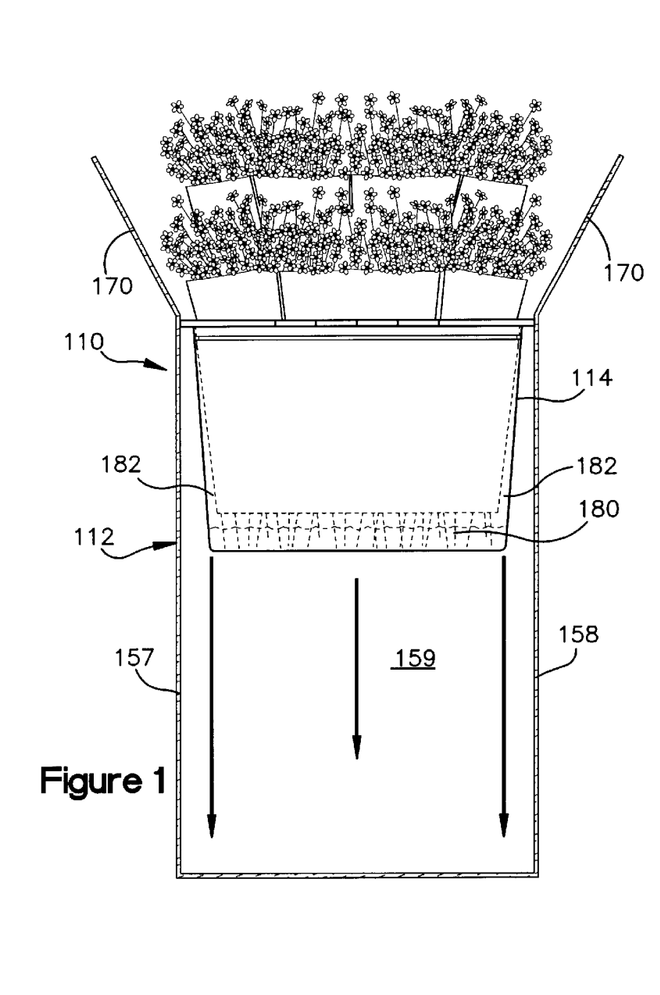
FIG. 1 is a side view of a floral shipper including a floral container according to the present invention, an outer container of the shipper being shown in section and the inner floral container being shown as it is being inserted into the outer container.
Figure 2:
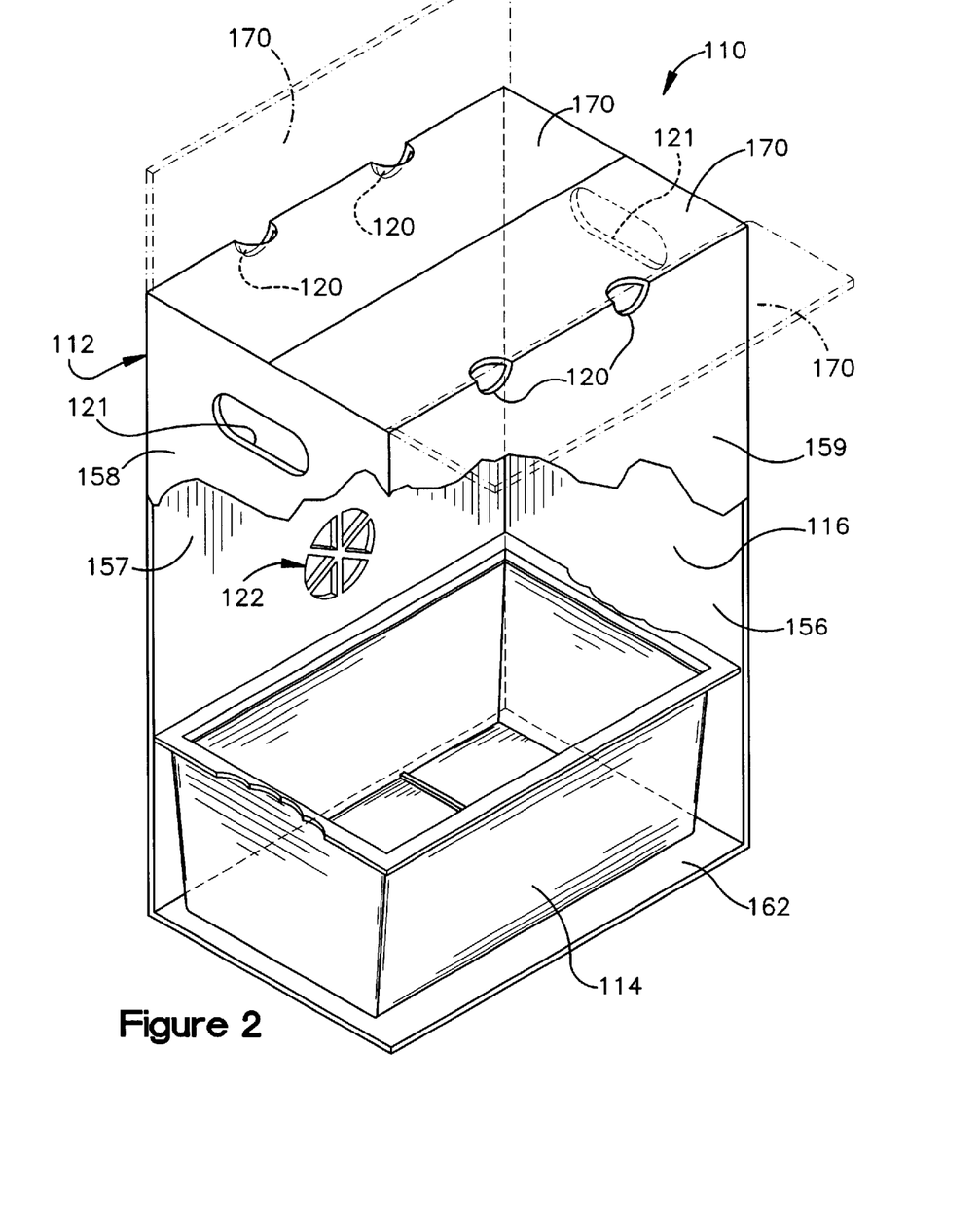
FIG. 2 is a perspective view of the floral shipper, the outer container having a portion broken away to show the inner floral container.

Referring now to the drawings, and initially to FIGS. 1 and 2, a floral shipper 110 for transporting floral groupings (e.g., bunches of fresh cut flowers and foliage) is shown. The floral shipper 110 includes an outer container 112 and a floral container assembly 114 according to the present invention. The floral container assembly 114 supports bottom portions of the floral grouping (e.g., lower stem portions) and is inserted into the outer container 112 for protection during shipping. The top portions of the floral groupings (e.g., upper stem portions, buds, blooms) occupy an open upper region 116 of the outer container.

The outer container 112 has a rectangular box shape and may be made of corrugated cardboard. Ventilation openings 120, 121 and/or 122 may be provided in the cardboard to circulate air through the outer container 112 during the shipping process. The illustrated outer container 112 includes side walls 156–159, a bottom wall 162, and hinged top panels 170. The height dimension of the outer container's side walls 156–159 is greater than that of the inner container assembly 114 to define the open upper region 116. The width/length dimensions of the outer container's walls are such that the inner container assembly 114 may be received therein in a nesting relationship. While, in the illustrated embodiment, the outer container 112 receives a single floral container assembly 114, the containers may instead be sized so that two or more inner container assemblies 114 fit into each outer container 112. Further details of a suitable outer container for the floral shipper 110 is disclosed in U.S. patent application Ser. No. 09/317,933, the entire disclosure of which is hereby incorporated by reference.

Figure 3:
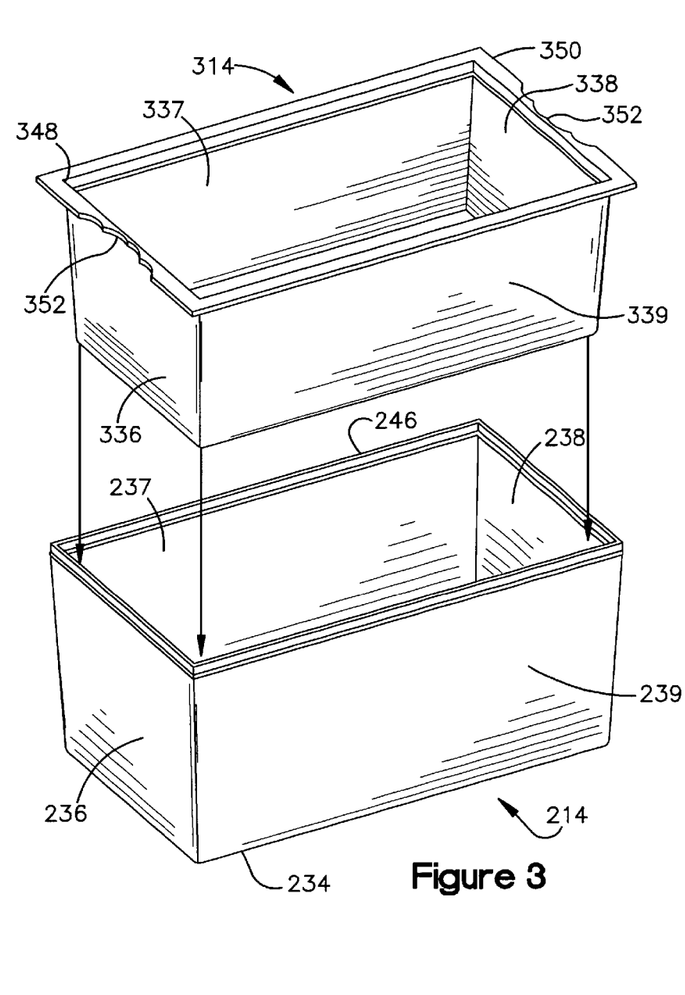
FIG. 3 is a perspective view of the two parts of the floral container, namely a receptacle and an insert.

The floral container assembly 114 includes a lower liquid-holding region 180 and a spill-catching region 182 which are defined by a receptacle 214 (FIG. 3) and an insert 314 (FIG. 3). The receptacle 214 holds water (or a water/preservative mixture) in the liquid-holding region 180. The insert 314 holds the flowers in an upright position so that their stems may extend downwardly into the liquid-holding region 180 and their tops may extend upwardly into the open region 116 of the outer container 112.

If the floral shipper 110 and/or the floral container assembly 114 are tilted, the displaced liquid from the bottom region 180 will flow into the spill-catching region 182 rather spill onto surrounding materials. The volume of the spill catching region 182 is such that if the floral container assembly is tipped on its side, a substantial part of the water will be retained. It should be noted that this water-retaining feature of the inner container assembly 114 is independent of the outer container 112 and may provide advantages in a retail setting. Thus, although the container 114 is shown and described as part of the floral shipper 110, it can be used independently of the outer container 112.

Referring now additionally to FIG. 3, a floral container assembly 114 according to the present invention is shown isolated from the outer container 112. In the illustrated embodiment, the receptacle 214 and the insert 314 are two separate parts which are assembled together to form the container 114. These parts may be separately made by injection molding plastic or other suitable polymeric materials. However, a floral container in which the receptacle and the insert are integrally formed and/or permanently assembled is possible with, and contemplated by, the present invention.

The receptacle 214 has a substantially rectangular box-like shape including a bottom wall 234 and four side walls 236–239 which taper inwardly from top to bottom. (See also FIG. 1.) The height dimension of the side walls 236–239 is substantially less than the side walls 156–159 of the outer container 112 so that, in the assembled floral shipper 110, the upper open region 116 will be provided for the tops of the floral grouping. The width/length dimensions of the side walls 236–239 are such that the receptacle 214 may be received within the outer container 112 in a nesting relationship. The corners between the walls may be rounded to prevent sharp contact with, for example, the outer cardboard container 112 or handling equipment.

Figure 4:
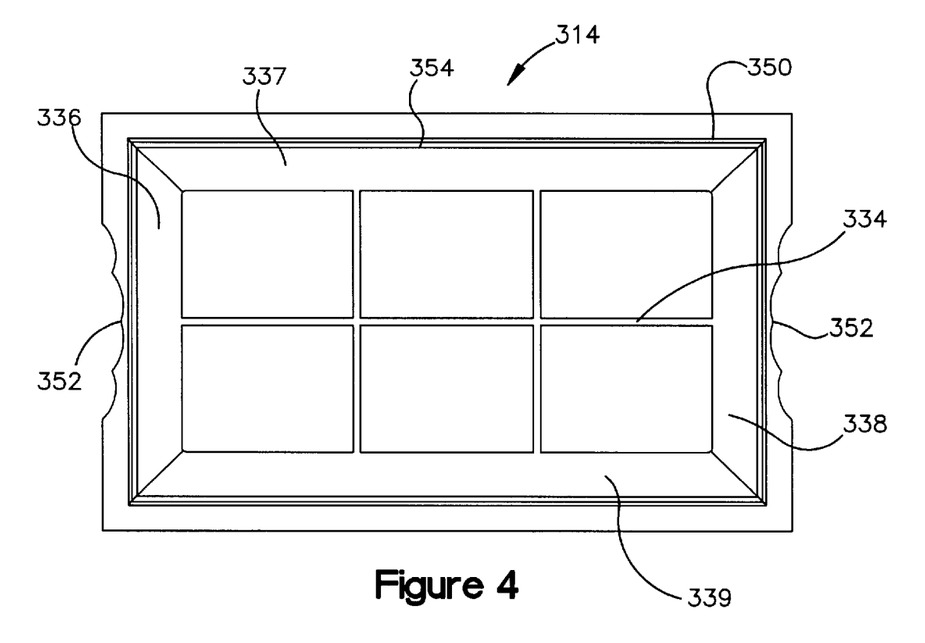
FIG. 4 is a top view of the insert.

Referring to FIGS. 3 and 4, the insert 314 has a substantially rectangular box-like shape including a bottom grid 334 and side walls 336–339. The insert 314 does not include a bottom wall so that, in the assembled container 114, the stems of the flowers have a passageway into the liquid-holding region 180. The illustrated grid 334 forms six open compartments and extends between the bottom portions of the side walls 336–339. The design of the grid 334 may be modified to include more or fewer compartments and/or the grid 334 may positioned at any height location relative to the side walls 336–339 which suitably supports the flowers in the desired manner. Moreover, a "grid-less" insert with simply an open bottom is certainly possible with and contemplated by the present invention.

The insert's side walls 336–339 taper inwardly top to bottom at an angle greater than the taper of the receptacle's side walls 236–239. The height dimension of the insert's side walls 336–339 is less than the receptacle's side walls 236–239 and the width/length dimensions of the side walls 336–339 are such that the insert 314 may be received within the receptacle 214 in a nesting relationship. In the assembled container 114, the bottom of the insert 314 is positioned above the bottom of the receptacle 214 so that the receptacle's bottom wall 234 and bottom portions of its side walls 236–238 define the container's liquid-holding region 180. Also, the insert's side walls 336–339 are positioned inward from the receptacle's side walls 236–239 thereby defining the container's spill-catching region 182. (See FIG. 1.)

The side walls 336–339 include a rectangular lip 350 extending outwardly from the top edges of the side walls 336–339. The lip 350 may include two slots 352 sized and shaped to form handles to facilitate manual grasping of the opposite sides of the insert 314. The handle-forming slots 352 may be used for lifting, lowering and carrying of the insert 314 and thus, perhaps more significantly, the assembled floral container 114. If necessary or desired, the lip 350 may also be designed to provide stiffness, stress-inhibiting, anti-flexing, and/or flower-protecting qualities for the container 114.

Figure 5:
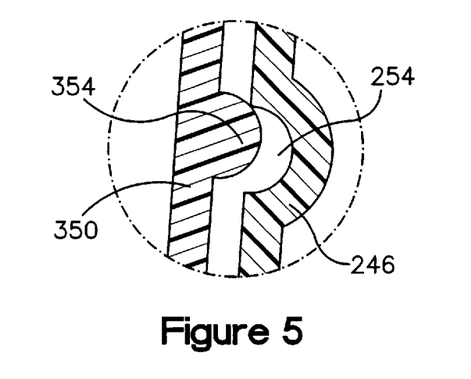
FIG. 5 is an enlarged view showing the locking components of the receptacle and the insert.

Referring to FIGS. 3 and 5, the top edges of the side walls 236–239 of the receptacle 214 together form a rectangular perimeter 246 having a semicircular (in cross-section) groove 254. The bottom surface of the lip 350 of the insert 314 includes a semi-circular (in cross-section) bead 354 about its rectangular perimeter. The insert's bead 354 is sized and positioned to mate with the receptacle's groove 254 thereby forming a locking arrangement between the receptacle 214 and the insert 314. This locking arrangement should be able to hold the desired loaded weight so that the floral container 114 may be loaded or carried in an assembled condition with the handle-forming slots 352. A desired loaded weight would be, for example, the combined weight of fifteen fresh flower bouquets and four liters of water. The locking arrangement should also be able to seal in liquid within the spill-catching region 182 so that, if the floral shipper 110 and/or the floral container 114 is tilted, the displaced liquid will be trapped therein.

To use the floral container 114, water is poured into the receptacle 214 to a desirable level (which will usually be below the bottom edge of the insert 314) thereby filling the liquid-holding region 180. The insert 314 is then placed into the receptacle 214 and the insert's bead 354 is mated with the receptacle's groove 254 to lock the two container parts together. If the receptacle 214 and the insert 314 are integrally formed and/or permanently assembled, the water could be poured into the receptacle 214 through the insert compartments or, in the case of a grid-less insert, simply through the insert's open bottom.

Flowers may then be placed in the insert 314 so that their stems extend into the liquid in the bottom region 180 of the floral container 114. If the insert 314 includes compartments, such as those formed by the grid 334 in the illustrated embodiment, the flowers may be evenly distributed between the compartments.

The flower-loaded floral container 114 may then be lowered into the outer container 112 to assemble the floral shipper 110. In the assembled shipper 110, the tops of the floral grouping(s) will be positioned in the upper open region 116 of the outer container 112. Once the floral shipper 110 arrives at a retail setting, the inner floral container 114 may be removed from the outer container 112. Since the floral container 112 may be of a suitable display size and exhibits an ascetically pleasing look, the wet-packed flowers may be presented therein.

Figure 7:
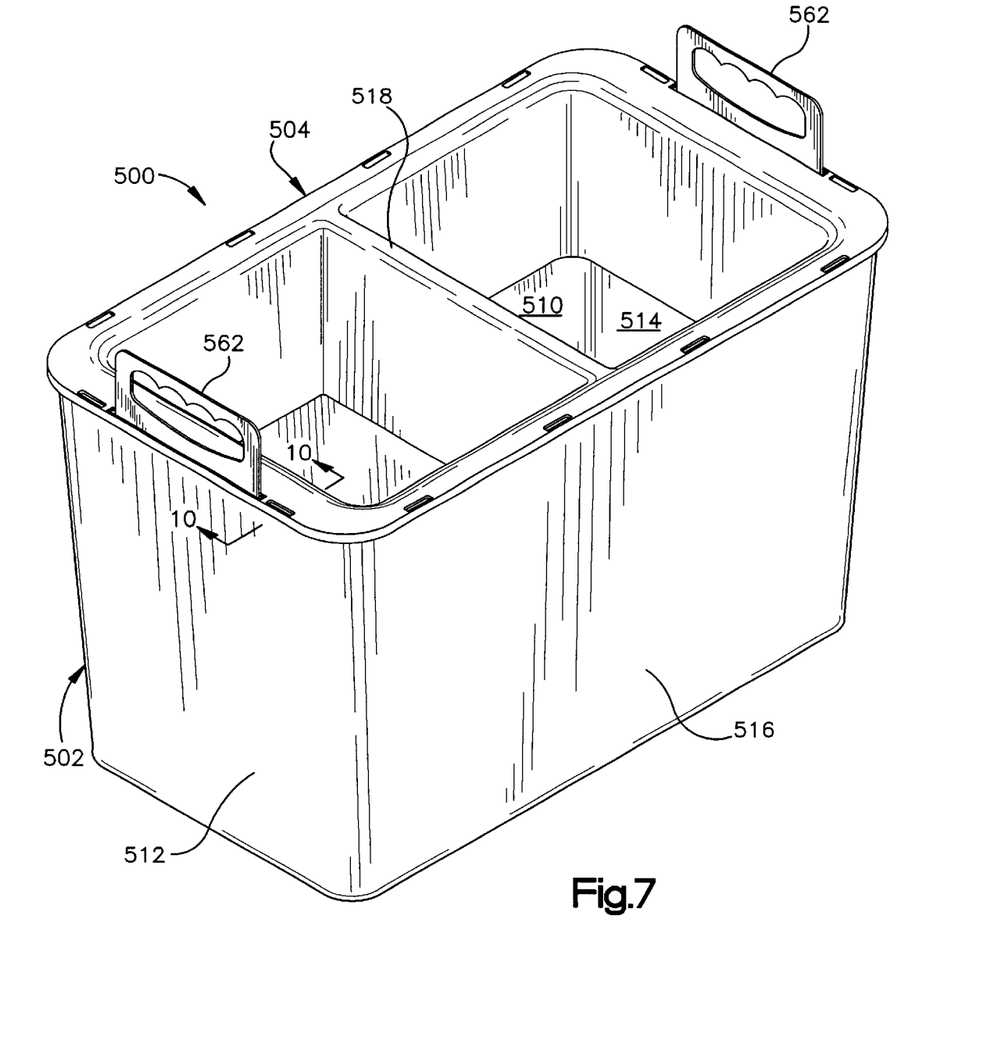
FIG. 7 is a perspective illustration of a second embodiment of the floral container of the present invention.
Figure 8:
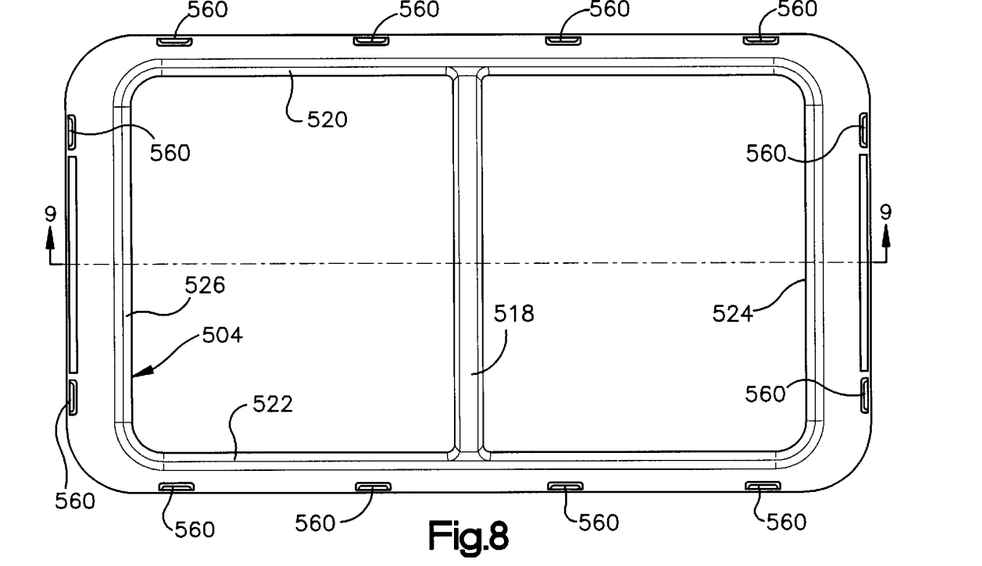
FIG. 8 is a plan view of the floral container of FIG. 7.

FIG. 7 illustrates a second embodiment of a floral container assembly 500 according to the present invention. The floral container assembly 500 is formed from two separate pieces, an outer receptacle 502 and an insert 504. The receptacle 502 defines the outer shape of the container assembly 500 and has a closed the bottom 506 (FIG. 9) and solid sides 510, 512, 514, and 516 to retain water and flowers. The insert 504 locks onto the receptacle 502 and provides a divider 518 to hold the flowers upright and walls 520, 522, 524, and 526 (FIGS. 7, 8, and 9) to prevent water from escaping from the receptacle if it is tipped over or moved suddenly.

The floral container assembly 500 is shaped and proportioned to fit within an outer container like the container 112 illustrated in FIG. 1. The floral container assembly 500 has rounded corners and slightly sloping sides 510–516 both to allow the container to fit easily into the outer container 112 and to make it easier to mold. Further, the rounded corners and sloping side walls 510–516 mean that when one receptacle 502 is stacked inside another, they can be easily separated from one another.

The insert 504 is shaped to engage the top edge 530 (FIG. 10) of the receptacle 502 and to fit within the outer container 112. To this end the insert 504 has two inwardly tapering side walls 520, 522, two inwardly tapering end walls 524 and 526, and a horizontally extending lip or rim 532 around the periphery. The walls 520–526 extend downward from the inner periphery 534 (FIG. 9) of the rim 532 toward but do not reach the bottom 506 of the receptacle 502. The bottom of the insert 504 is open so that flower stems may extend through the insert and into water which is in the receptacle 502.

Figure 9:
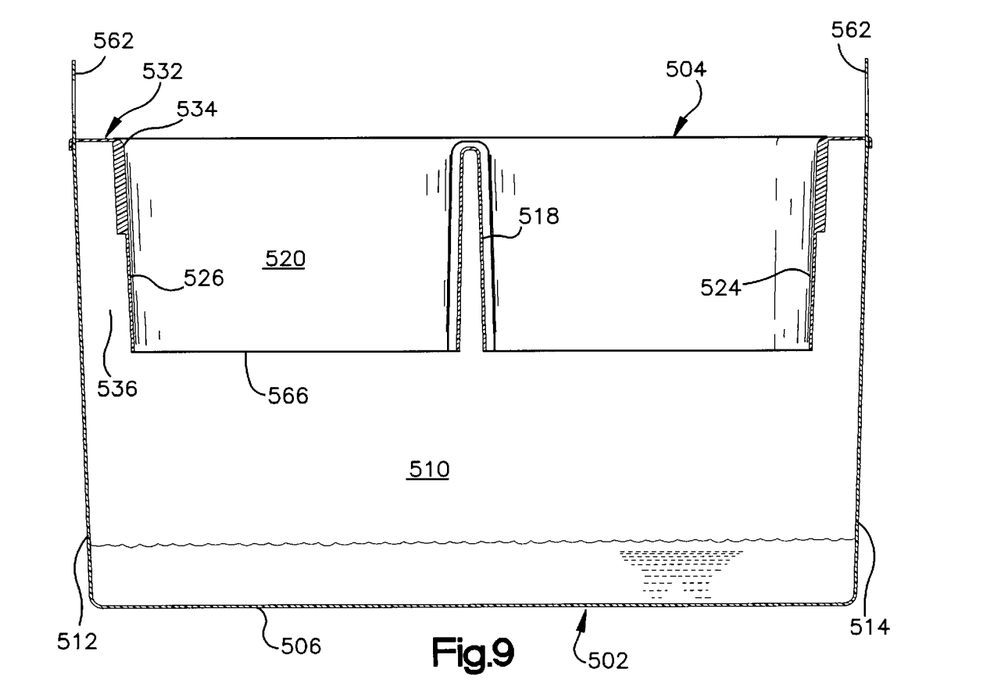
FIG. 9 is a cross-section view looking in the direction of arrows 9—9 of FIG. 8.

The rim 532 (FIG. 10) overlays the top edge 530 of the receptacle 502 and extends inward. This has the effect of spacing the side and end walls 520–526 (FIGS. 8 and 9) of the insert 504 inward from walls 512–516 of the receptacle 502. A cavity 536 is defined between the inside of the receptacle sides 510–516 and the outside of the insert's walls 520–526, as shown in FIG. 9. This space serves to contain water should the floral container assembly 500 tip over or be moved suddenly so that the water sloshes inside the receptacle 502.

Figure 10:
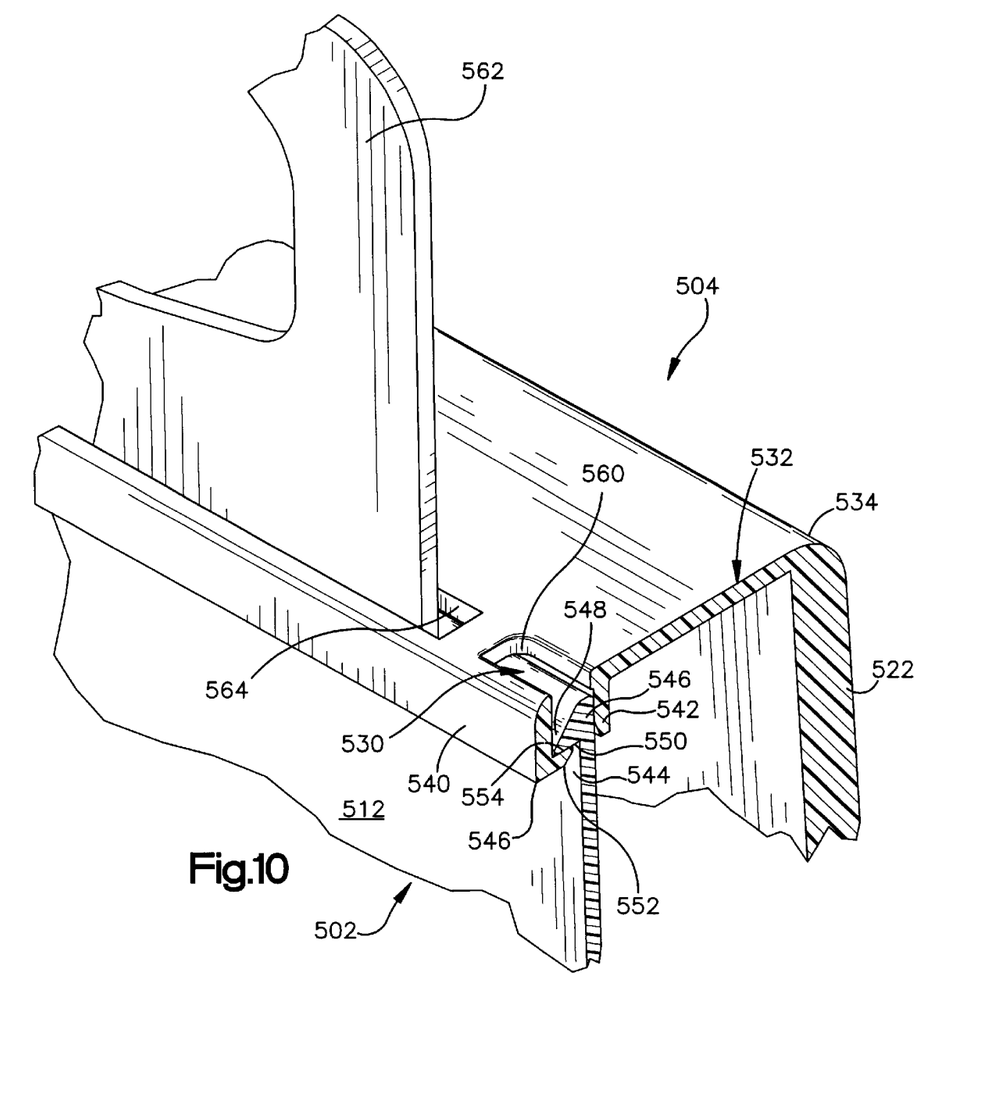
FIG. 10 is a cross-sectional view looking in the direction of arrows 10—10 in FIG. 7.

The insert 504 is releasably secured to the receptacle 502 in a manner that limits or prevents water from escaping between the insert and receptacle. The connection is shown in FIG. 10. The rim 532 of the receptacle 502 has an outer skirt 540 which extends downward from the rim around its entire periphery. A retaining wall 542 projects downward from the bottom surface of the rim, spaced just inward from the outer skirt 540 around the entire periphery of the rim. The skirt 540 and retaining wall 542 define a capture groove 544 between them.

The top edge 530 of the receptacle is proportioned to fit snugly within the capture groove 544. The top edge of the receptacle includes a bead 546 that has a tapered face 548 and a flat underside 550 to cooperate with the capture groove 544 formed by the skirt 540 and the retaining wall 542. As the insert 504 is positioned on the receptacle 502 and pressed downward, the tapered face 548 of the bead 546 presses against a correspondingly tapered face 552 on the bottom of the outer skirt 540, pressing the outer skirt outward and flexing the retaining wall 542 inward. The outer skirt 540 has a ledge 554 that extends inward. Once the bead reaches its final position, the flat underside 550 of the bead 546 snaps across the ledge 554 of the skirt, and the insert 504 is locked in place. The snug fit between the bead 546 and the capture groove 544 assures a preload against the retaining wall 542 and therefore a water resistant or water proof seal. The seal may be enhanced with the use of a gasket or grease-like inert material such as Vaseline or a silicone-based product. An adhesive may be used if the floral container assembly is not to be disassembled.

Openings 560 are formed in the rim 532 to facilitate removal of the insert 504 from the receptacle 502. Four openings 560 (FIG. 8) are formed along each side and two along each end wall of the insert. To remove the insert 504, a worker can use a straight bladed screwdriver or a similar tool, inserting it through the openings 560 to bend the outer skirt 540 away from the bead 546 and so release the insert. The fact that the inserts 504 may be readily released from the receptacles 502 permits empty floral container assemblies 500 to be taken apart. Then groups of the receptacles 502 and groups of the inserts 504 may be stacked, one on top of another in a snug, nested arrangement for shipment back to a grower for reuse.

The floral container assembly 500 also includes handles 562 that make it easy to remove the container assembly from an outer container 112. The handles 562 are integral with the receptacle and extend upward from the end walls 512, 514 of the receptacle. The handles 562 are flat, no thicker than the receptacle walls themselves, thus posing no impediment to the nested stacking of receptacles. The rim 532 of the insert 504 has slots 564 (FIG. 10) through which the handles 562 extend. The handles 562 could be located on the side walls as well the end walls, and there could be one, two or more handles on any side of the receptacle, though one in each end wall is sufficient and ergonomicly appropriate.

A divider 518 spans the insert, extending between opposite side walls 520 and 522. The divider 518 serves to keep the side walls 520 and 522 of the insert 504 planar, that is, it keeps the side walls from buckling along their length. In addition the divider 518 separates the opening through the insert 504 into two separate areas. Since each of the areas holds about as many bunches of flowers as a worker can place in the box at one time, the divider 518 also makes it easier to load bunches of flowers into floral container assembly 500. The divider 518 keeps a first group of flowers from falling over while the worker reaches for the second group to put them in the other half of the container assembly 500. The divider 518 also can assist at the point of sale, again keeping bunches of flowers from falling over.

The divider 518 has a generally U-shaped cross-section (FIG. 9) and may extend vertically from the plane of the rim 532 down to the bottom edge 566 of the insert. With this construction, divider 518 does not interfere with the nested stacking of inserts described above. The divider 518 may be shorter or taller as the designer may decide. A shorter divider may not support the side wall against buckling as well but may be adequate depending on other design choices such as wall thickness and the like. In addition, the U-shaped divider may be used to divide the open area of the container assembly 500 into more areas, such as three areas (using two dividers) or more, as shown in FIG. 4. Again, the total size of the container assembly, the type of flowers, and the wall thickness of the insert 504 should all be considered in the placement and size of the dividers.

When the inserts 504 and receptacles 502 are manufactured, they may be shipped in separate stacks to the grower where flowers are picked and packaged for shipment. Nesting and stacking makes the shipment of disassembled floral containers more efficient because the stacks are denser than assembled floral containers.

As can be appreciated by the foregoing, the floral container assemblies 114, 500 provide a stiff yet lightweight structure for holding water and floral groupings. The floral container assemblies 114 and 500 are also of a convenient size and exhibit an aesthetically pleasing look for presenting flowers so that they may be used in a retail setting. Further, the floral container assemblies 114 and 500 have built-in water retention features that provide a reasonable assurance that liquid associated with wet-packed fresh flowers will remain in the containers. These water retention features minimize spill-related damage to the outer corrugated cardboard containers during shipping and also to surrounding retail areas during display. It should be noted that while the generally rectangular container assemblies 114 and 500 have been disclosed and certain advantages can be obtained in terms of dense packing arrangements of rectangular container assemblies for shipping purposes, the invention is not limited to that shape. The container assemblies could easily be made oval in shape, or round, or hexagonal, for example, without departing from the scope of the invention.

Figure 6:
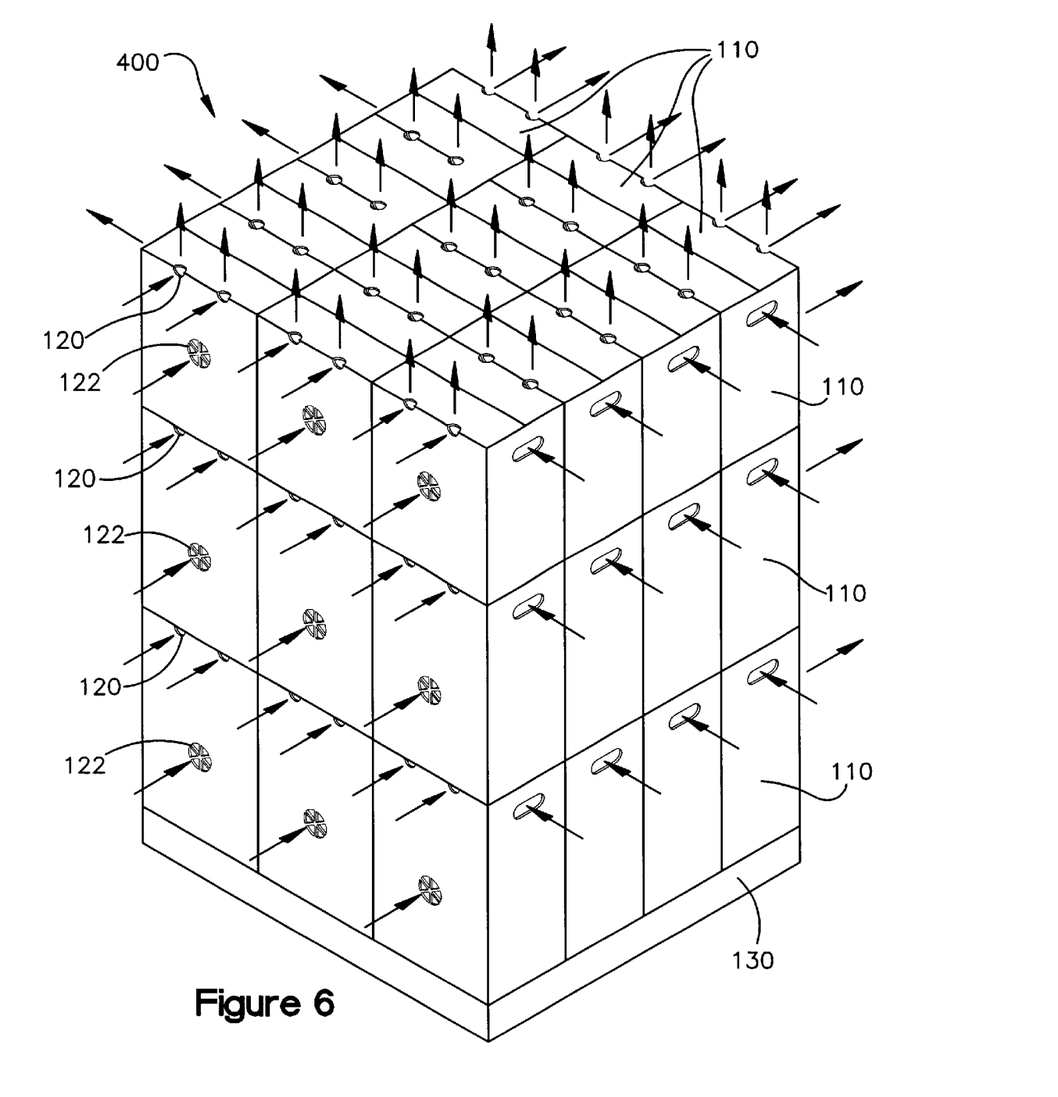
FIG. 6 is a perspective view of a floral shipper assembly comprising a plurality of the floral shippers assembled on a pallet.

A floral shipping assembly 400 comprising a plurality of the floral shippers 110 is shown in FIG. 6. In this assembly 400, the floral shippers 110 are oriented front-to-back, side-by-side, and top-to-bottom on a pallet 430. To facilitate the most efficient use of space on the pallet 430 and a compact relationship between adjacent floral shippers 110, the walls of the outer containers 112 may be sized so that a predetermined assembly of the floral shippers 110 substantially matches the dimensions of the pallet 430. For example, if the pallet 430 comprises a standard-sized pallet that is forty inches wide and forty-eight inches long, each floral shipper 110 may have a width of ten inches and a length of sixteen inches so that four rows and three columns of floral shippers 110 may be loaded on the pallet 430. The vertical stacking of the floral shippers 110 (three in the illustrated embodiment) depends on the desired loading of the pallet 430 and/or the strength of the outer container 112.

In the design of the illustrated outer container 112, the ventilation openings 121 of adjacent front-to-back shippers 110 align to form an air circulation path through each of the four rows. Also, the ventilation openings 120 and 122 of adjacent side-by-side shippers 110 align to form another air circulation path through each of the three columns. The direction of the air circulation path provided by the openings 121 is transverse to the direction of the air circulation path provided by the openings 120 and 122.

The illustrated floral shipper assembly 400 has an arrangement of shippers 110 that permits an efficient use of space as well as constant circulation of air within the shippers 110. That being said, other shipper arrangements on the pallet, different pallet designs, and/or alternative outer container constructions (with or without ventilation openings) are possible with, and contemplated by, the present invention.

Although the invention has been shown and described with respect to certain embodiments, it is obvious that equivalent alterations and modifications will occur to others skilled in the art upon the reading and understanding of this specification. The present invention includes all such alterations and modifications and moreover is limited only by the scope of the following claims.

What is claimed is:

1. A container for supporting a floral grouping in an upright position for shipment, said container comprising a receptacle and an insert positioned within the receptacle;
   the receptacle including a bottom wall and side walls;
   the insert including side walls which at least partially support the floral grouping, and a bottom edge which is positioned above the bottom wall of the receptacle;
   the bottom wall of the receptacle and bottom portions of the receptacle's side walls defining a liquid-holding region of the container;
   the insert including a passageway to the liquid-holding region whereby stems of the floral grouping may extend through the passageway and into the liquid holding region; an upwardly extending handle connected to the receptacle, the insert having an opening at least partially surrounding the handle, and the handle extending beyond and above the insert.

2. A container as set forth in claim 1, wherein the receptacle has a substantially rectangular box-like shape and wherein the insert has a substantially rectangular box-like shape shorter in height than the receptacle.

3. A container as set forth in claim 2, wherein the side walls of the receptacle taper inwardly top to bottom and wherein the side walls of the insert taper inwardly top to bottom at a greater angle than the receptacle's sidewalls thereby forming the spill-catching region therebetween.

4. A container as set forth in claim 1, wherein the side walls of the receptacle and the side walls of the insert define a spill-catching region which communicates with the liquid-holding region.

5. A container as set forth in claim 1, wherein the insert includes at least one divider positioned to form compartments for the stems of the floral grouping.

6. The container of claim 5 wherein the divider extends between opposite sidewalls of the insert along their entire vertical extent.

7. A container as set forth in claim 5, wherein the grid extends between bottom portions of the side walls of the insert.

8. A container as set forth in claim 1, wherein the receptacle and the insert are separate parts which may be selectively assembled and disassembled from each other.

9. A container as set forth in claim 8, wherein the receptacle and the insert include locking components which mate together in the assembled container.

10. A container as set forth in claim 9, wherein the locking components include a groove and a bead sized and positioned to be received in the groove.

11. The container claim 8 wherein the insert includes a capture groove engaging opposite sides of a top portion of the insert.

12. The container of claim 11 wherein the top portion of the receptacle includes a bead that cooperates with the capture groove to form a snug fit between the capture groove and the bead, thereby to limit egress of water from between the insert and the receptacle.

13. The container of claim 8, including a lip extending outwardly from the side walls of the receptacle.

14. The container of claim 13, wherein the lip is integrally formed with the side walls of the insert.

15. The container of claim 14, wherein the lip extends outward from top edges of the side walls of the insert.

16. The container of claim 15, wherein the lip includes locking components which mate with locking components of the receptacle in the assembled container.

17. The container of claim 8 wherein the receptacle is configured to form a nested stack with similarly shaped receptacles.

18. The container of claim 17 wherein the insert is configured to form a nested stack with similarly shaped inserts.

19. A container as set forth in claim 18, wherein the insert includes at least one divider positioned to form compartments for the stems of the floral grouping.

20. The container of claim 19 wherein the divider extends between opposite sidewalls of the insert along their entire vertical extent.

21. A container as set forth in claim 19, wherein the grid extends between bottom portions of the side walls of the insert.

22. A floral shipper comprising an inner container as set forth in claim 1 and an outer container; the outer container having a bottom wall and a plurality of side walls extending upwardly therefrom, the side walls of the outer container extending to a height above the height of the inner container to define an upper open region for tops of the floral grouping.

23. A container for supporting a floral grouping in an upright position for shipment, said container comprising a receptacle and an insert positioned within the receptacle;
the receptacle including a bottom wall and side walls;
the insert including side walls which at least partially support the floral grouping and a bottom edge which is positioned above the bottom wall of the receptacle;
the bottom wall of the receptacle and bottom portions of the receptacle's side walls defining a liquid-holding region of the container; and
the insert including a passageway to the liquid-holding region whereby stems of the floral grouping may extend through the passageway and into the liquid holding region,
the receptacle and the insert being separate parts which may be selectively assembled and disassembled from each other,
the container including a lip integrally formed with the side walls of the insert, extending outward from top edges of the side walls of the insert and extending outwardly from the side walls of the receptacle, and
wherein the lip includes locking components which mate with locking components of the receptacle in the assembled container, the locking components including either a groove or a bead positioned on the bottom surface of the lip and the other of the groove or the bead positioned on a top surface of the receptacle.

24. The container of claim 23 wherein the handles are integrally formed with an upper edge portion of the receptacle.

25. A container for supporting a floral grouping in an upright position for shipment, said container comprising a receptacle and an insert positioned within the receptacle;
the receptacle including a bottom wall and side walls;
the insert including side walls which at least partially support the floral grouping and a bottom edge which is positioned above the bottom wall of the receptacle;
the bottom wall of the receptacle and bottom portions of the receptacle's side walls defining a liquid-holding region of the container;
the insert including a passageway and into the liquid holding region whereby stems of the floral grouping may extend through the passageway and into the liquid holding region;
the receptacle and the insert being separate Darts which may be selectively assembled and disassembled from each other;
the container including a lip integrally formed with the side walls of the insert, extending outward from top edges of the side walls of the insert and extending outwardly from the side walls of the receptacle; and
the container including handles connected to the receptacle, integrally formed with an upper edge portion of the receptacle and extending through openings formed in the lip.

26. A method of using a container for supporting a floral grouping in an upright position for shipment, said container comprising a receptacle and an insert positioned within the receptacle;
the receptacle including a bottom wall and side walls, the side walls having an upper edge portion defining an upper perimeter of the receptacle the receptacle having a handle connected to it;
the insert including side walls which at least partially support the floral grouping, and a bottom edge which is positioned above the bottom wall of the receptacle, the side walls being connected to at least a portion of the upper perimeter of the receptacle the insert further including an opening at least partially surrounding the handle;
the bottom wall of the receptacle and bottom portions of the receptacle's side walls defining a liquid-holding region of the container; and
the insert including a passageway to the liquid-holding region whereby stems of the floral grouping may extend through the passageway and into the liquid holding region,
the method comprising the steps of
pouring the liquid into the liquid-holding region of the receptacle and
placing floral groupings into the insert.

27. A method as set forth in claim 26, wherein said pouring step comprising pouring the liquid to a level below the bottom edge of the insert.

28. A method as set forth in claim 26, further comprising the step of locking the receptacle and insert together.

29. A method of using a container for supporting a floral grouping in an upright position for shipment, said container comprising a receptacle and an insert positioned within the receptacle;

the receptacle including a bottom wall and side walls, the side walls having an upper edge portion defining an upper perimeter of the receptacle the receptacle having a handle connected to it;

the insert including side walls which at least partially support the floral grouping, and a bottom edge which is positioned above the bottom wall of the receptacle, the side walls being connected to at least a portion of the upper perimeter of the receptacle the insert further including an opening at least partially surrounding the handle;

the bottom wall of the receptacle and bottom portions of the receptacle's side walls defining a liquid-holding region of the container; and the insert including a passageway to the liquid-holding region whereby stems of the floral grouping may extend through the passageway and into the liquid holding region, the method comprising the steps of pouring water into the receptacle and placing floral groupings into the insert so that they are substantially evenly distributed among the compartments.

30. A method of using the container for supporting a floral grouping in an upright position for shipment, said container comprising a receptacle and an insert positioned within the receptacle;

the receptacle including a bottom wall and side walls, the side walls having an upper edge portion defining an upper perimeter of the receptacle the receptacle having a handle connected to it;

the insert including side walls which at least partially support the floral grouping, and a bottom edge which is positioned above the bottom wall of the receptacle, the side walls being connected to at least a portion of the upper perimeter of the receptacle the insert including an opening at least partially surrounding the handle;

the bottom wall of the receptacle and bottom portions of the receptacle's side walls defining a liquid-holding region of the container; and the insert including a passageway to the liquid holding region whereby stems of the floral grouping may extend through the passageway and into the liquid holding region, the method comprising the steps of:
  pouring the liquid into the liquid-holding region of the receptacle;
  placing the insert into the receptacle; and
  placing floral groupings through the insert.

31. A floral shipper assembly comprising a pallet and a plurality of floral shippers, each floral shipper comprising an inner container and an outer container, the inner containers comprising a receptacle and an insert positioned within the receptacle the receptacle having a handle connected to it;

the receptacle including a bottom wall and side walls, the side walls having an upper edge portion defining an upper perimeter of the receptacle;

the insert including side walls which at least partially support the floral grouping and a bottom edge which is positioned above the bottom wall of the receptacle, the side walls connected to at least a portion of the upper perimeter of the receptacle the insert further including an opening at least partially surrounding the handle;

the bottom wall of the receptacle and bottom portions of the receptacle's side walls defining a liquid-holding region of the container; and the insert including a passageway to the liquid holding region whereby stems of the floral grouping may extend through the passageway and into the liquid holding region, each outer container having a bottom wall and a plurality of side walls extending upwardly therefrom, the side walls of the outer container extending to a height above the height of the inner container to define an upper open region for tops of the floral grouping, the shippers being arranged in rows and columns on the pallet, each of the shippers having length and width dimensions so that the overall length dimension and the overall width dimension of the floral shipper assembly matches the respective width and length of the pallet.

32. A method of assembling a floral shipper, the floral shipper comprising an inner container and an outer container, the inner container comprising a receptacle and an insert positioned within the receptacle;

the receptacle including a bottom wall and side walls, the side walls having an upper edge portion defining an upper perimeter of the receptacle the receptacle having a handle connected to it;

the insert including side walls which at least partially support the floral grouping and a bottom edge which is positioned above the bottom wall of the receptacle, the side walls being connected to at least a portion of the upper perimeter of the receptacle the insert further including an opening at least partially surrounding the handle;

the bottom wall of the receptacle and bottom portions of the receptacle's side walls defining a liquid holding region of the container; and the insert including a passageway to the liquid holding region whereby stems of the floral grouping may extend through the passageway and into the liquid holding region, the outer container having a bottom wall and a plurality of side walls extending upwardly therefrom, the side walls of the outer container extending to a height above the height of the inner container to define an upper open region for tops of the floral grouping, the method comprising the steps of:
  pouring water into the receptacle;
  placing floral groupings into the insert; and
  loading the assembled inner container into the outer container.

* * * * *